United States Patent [19]

Torii et al.

[11] Patent Number: 4,549,846
[45] Date of Patent: Oct. 29, 1985

[54] AUTOMATIC HAND CHANGING DEVICE FOR INDUSTRIAL ROBOTS

[75] Inventors: Nobutoshi Torii, Hachioji; Ryo Nihei, Musashino, both of Japan

[73] Assignee: Fanuc Ltd, Tokyo, Japan

[21] Appl. No.: 488,079

[22] Filed: Apr. 25, 1983

[30] Foreign Application Priority Data

Apr. 27, 1982 [JP] Japan ................... 57-969492

[51] Int. Cl.$^4$ ............................................. B25J 15/04
[52] U.S. Cl. ........................................ 414/729; 24/603; 24/607; 901/30
[58] Field of Search ....... 180/89.15; 24/603, 606–608; 414/729, 730; 901/30, 9, 50

[56] References Cited

U.S. PATENT DOCUMENTS

| | | | |
|---|---|---|---|
| 3,170,362 | 2/1965 | Mewse | 24/453 X |
| 3,430,305 | 3/1969 | Geffner | 24/603 |
| 3,967,797 | 7/1976 | Drew | 24/603 X |
| 4,144,794 | 3/1979 | Silverman et al. | 24/607 X |
| 4,275,986 | 6/1981 | Engelberger et al. | 901/9 |

FOREIGN PATENT DOCUMENTS

| | | | |
|---|---|---|---|
| 951616 | 3/1964 | United Kingdom | 24/453 |
| 957177 | 5/1964 | United Kingdom | 24/453 |

Primary Examiner—Terrance L. Siemens
Attorney, Agent, or Firm—Armstrong, Nikaido, Marmelstein & Kubovcik

[57] ABSTRACT

A robot hand changer for industrial robots, having a changer unit mounted fixedly on the industrial robots and a changer adapter holding a robot hand and being detachably fitted in the change unit. The changer unit has a fluid-operated piston and clamping balls urged toward a clamping position by the fluid-operated piston. The changer adapter is fitted in the changer unit and clamped by the agency of the clamping piston. A plurality of such changer adapters holding different kinds of robot hand are prepared.

4 Claims, 5 Drawing Figures

Fig. 4A
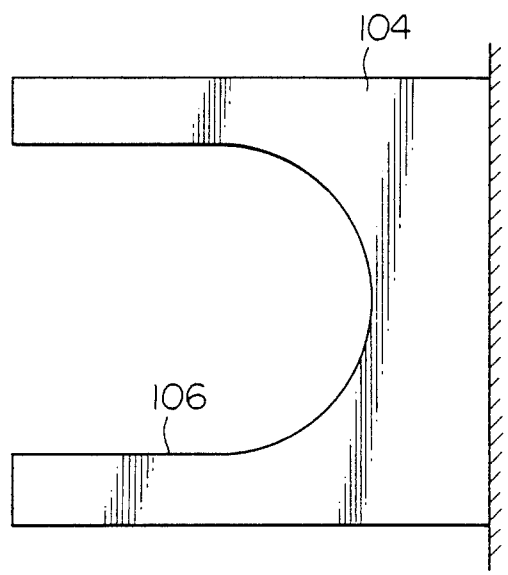
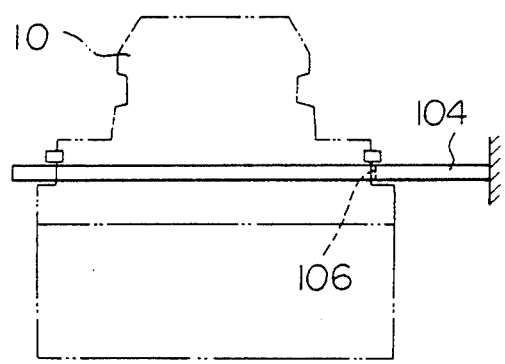
Fig. 4B

AUTOMATIC HAND CHANGING DEVICE FOR INDUSTRIAL ROBOTS

BACKGROUND OF THE INVENTION

1. Field of the Invention

The present invention relates to industrial robots, more particularly, to an automatic hand changing device for industrial robots, for changing and mounting robot hands of various working functions on free end of the arm of an industrial robot.

2. Description of the Prior Art

Industrial robots are used widely in combination with machine tools for automatic machining and automatic assembly, thus contributing to improving work efficiency and to saving labor.

Most conventional industrial robots are designed to perform a simple task with a robot hand attached fixedly to the free end of the robot arm. This fixed attachment is one of the causes restricting the versatility of industrial robots.

SUMMARY OF THE INVENTION

It is an object of the present invention to provide an automatic hand changing device capable of automatically changing various robot hands of various functions and attaching the same of an industrial robot to increase the versatility of the industrial robot.

According to the present invention, there is provided an automatic hand changing device for industrial robots, including a changer unit attached to the robot arm of the industrial robot and a changer adapter designed to be coupled with a robot hand and to be detachably joined to the changer unit. The device is characterized in that a clamping piston and clamping balls disposed so as to be pushed by the clamping piston to the respective clamping positions are provided within the changer unit and an engaging part designed to engage with the clamping balls provided within the changer unit is formed in the changer adapter, in order to change robot hands through changing the combination of the changer unit and the changer adapter. In this automatic hand changing device, the clamping piston is a single-acting piston which is advanced to push the clamping balls by supplying a pressurized fluid thereto and is retracted by spring force. At least three clamping balls are provided to securely clamp the changer adapter.

BRIEF DESCRIPTION OF THE DRAWING

Other objects and features of the invention will be apparent from the following description of a preferred embodiment thereof, reference being made to the accompanying drawings, in which:

FIGS. 4A and 4B are top and side views, respectively, of an exemplary constitution of a robot hand holding table for holding a changer adapter and a robot coupled with the same changer adapter.

DESCRIPTION OF THE PREFERRED EMBODIMENT

Figure 1:
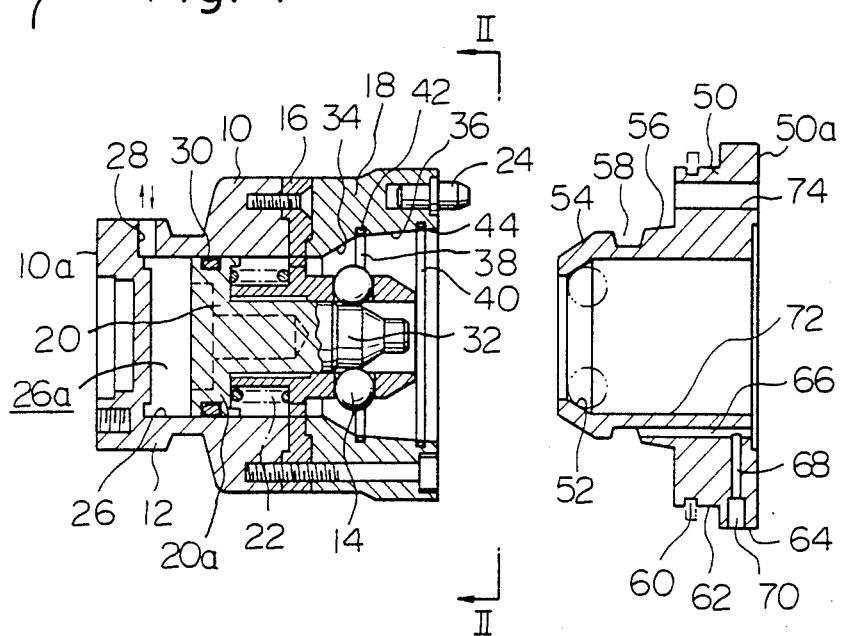
FIG. 1 is a sectional view of the constructions of a changer unit and a changer adapter forming an automatic hand changing device for industrial robots, embodying the present invention.

Referring to FIG. 1, an automatic hand changing device comprises a changer unit 10 designed to be mounted on the robot arm of an industrial robot and a changer adapter 50 designed to be coupled with robot hand. The changer unit 10 is fixedly and yet detachably fastened at one end surface 10a thereof to the robot arm by means of suitable fastening means such as screw bolts. The changer adapter 50 is designed to hold a robot hand at the outer end surface 50a thereof. Robot hands of different functions are coupled individually with the changer adapters 50 and fastened thereto beforehand by means of fastening means such as screw bolts.

Figure 2:
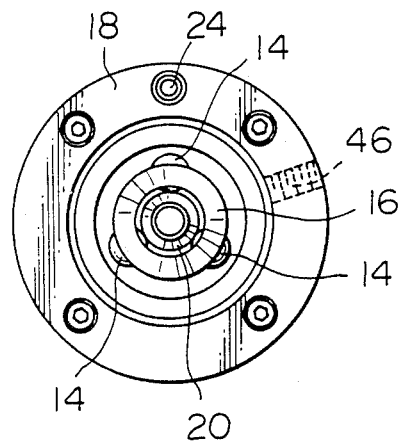
FIG. 2 is a side elevation of the changer unit of FIG. 1 as seen in the direction of the arrows II.

The changer unit 10 has a cylinder body 12 having the end surface 10a, a retainer 16 attached to the other end surface of the cylindrical body 12 formed opposite to the end surface 10a to retain clamping balls 14, an annular head 18 fixedly attached to the front side of the retainer 16, a piston 20 capable to axially sliding between the body 12 and the retainer 16, springs 22 each in abutment against the retainer 16 at one end thereof and in abutment against one surface of the piston 20 at the other end thereof to apply a resilient pressure directed from the retainer 16 toward the body 12, and a positioning pin 24 projecting from the front surface of the head 18. The body 12 is formed in an annular body having a bore 26. The piston 20 having, at its rear end, a pressure receiving part 20a is received in the cylindrical bore 26. Part 26a of the bore 26 defined in the rear of the piston 20 communicates with a fluid pressure inlet-and-outlet port 28. That is, the part 26a is a pressure chamber. When a pressurized fluid, such as pressurized air, is supplied into the pressure chamber 26a of the bore 26 through the fluid pressure inlet-and-outlet port 28, the piston 20 is advanced from the cylindrical body 12 toward the retainer 16. When the fluid pressure within the pressure chamber 26a of the bore 26 is released, the piston 20 is retracted by the resilient force of the springs 22 toward the cylindrical body 12. A sealing ring 30 is fitted in the piston 20 to seal the space between the outer circumference of the piston 20 and the inner circumference of the bore 26 of the body 12. The sealing ring 30 may be conventional O-ring. A clamp operating part 32 is formed in the front part of the piston 20. The clamp operating part 32 of piston 20 urges the clamping balls 14 (as shown in FIG. 2, this embodiment accomodates therein three clamping balls) movably retained by the retainer 16 to protrude radially outward of the retainer 16 when the piston 20 is advanced and causes the clamping balls 14 to retract within the retainer 16 when the piston 20 is retracted. Naturally, the clamping balls 14 will not slip out inwardly of the retainer 16 when the piston 20 retracts. Two conical surfaces 34 and 36 are formed inside of the head 18. The space formed between those conical surfaces 34 and 36 and the retainer 16 receives one end of the changer adapter 50, which will be described later. The conical surface 34 is formed so as to serve as an engaging surface in which a conical surface 54 formed in the end portion of the changer adapter 50 fits closely, while the conical surface 36 is formed so as to serve as a taper guide surface for smoothly and readily guiding one end of the changer adapter 50 into the changer unit 10.

FIG. 2 illustrates the changer unit 10 in a circular external form and the concentric disposition of the piston 20, the retainer 16 and the head 18. Referring again to FIG. 1, two axially spaced apart annular grooves 38 and 40 are formed in the inside surface of the head 18 of the changer unit 10. O-rings 42 and 44 for sealing are fitted in the annular grooves 38 and 40, respectively. When the changer adapter 50 is fitted in the changer unit 10, those O-rings 42 through 44 define therebetween a sealed space which communicates with a pressurized fluid inlet port 46 (FIG. 2) formed in the head 18.

The changer adapter 50 is formed in a hollow annular body having the above-mentioned front end surface 50a designed to hold a robot hand, not shown, and the rear end portion formed in a shape to fit the changer unit 10. Thus the changer adapter 50 has a conical engaging surface 52 formed inside thereof and designed to engage with the clamping balls 14 when the rear end portion is fitted in the changer unit 10 and a conical surface 54 formed in the outside thereof and designed to closely fit in the conical surface 34 of the head 18 when the rear end portion of the changer adapter 50 is fitted in the changer unit 10. A conical surface 56 of a less taper than that of the conical surface 54 is formed in the right side of the conical surface 54 in FIG. 1. An annular groove 58 is formed in the conical surface 56. When the rear end portion of the changer adapter 50 is fitted in the changer unit 10, the conical surface 56 fits smoothly in the conical surface 36 of the head 18 and the annular groove 58 is located between the two annular grooves 38 and 40 of the head 18. A flange is formed on the right side of the conical surface 56. A lower circular surface 62 including a groove 60 for receiving an E-ring and an upper circular surface 64 of a diameter greater than that of the lower circular surface 62 are formed in the flange. A pressurized fluid passageway 66 extending axially from the annular groove 58 and a radial pressurized fluid passageway 68 communicating with the pressurized fluid passageway 66 and having an opening 70 opening in the upper circular surface 64 are formed in the flange. These pressurized fluid passageways 66 and 68 are formed to permit the pressurized fluid supplied into the space between the annular grooves 38 and 40 of the head 18 of the changer unit to flow toward the opening 70 via the annular groove 58 of the changer adapter 50. The pressurized fluid brought to the opening 70 is used for operating the robot hand coupled with the changer adapter 50. In the interior part of the changer adapter 50, a cylindrical bore 72 extends rightward from the part of the maximum diameter of conical surface 52 so that the rear end portion of the changer adapter 50 is permitted to fit in the space between the head 18 and the retainer 16. A positioning hole 74 is formed axially in the flange of the changer adapter 50 to receive a positioning pin 24 provided on the head 18 of the changer unit 10 for coupling the changer unit 10 and the changer adapter 50 correctly in a fixed circumferential positional relationship.

The operation of the automatic hand changing device of the present invention will be described hereinafter.

As described hereinbefore, the changer unit 10 is fixed at the end face 10a, to the free end of the robot arm of an industrial robot. A plurality of changer adapters 50 are coupled individually with a plurality of the robot hands of different working functions and are arranged and stored in a fixed place. That is, a plurality of changer adapters 50 corresponding to the number of the robot hands are prepared.

In attaching a change adapter 50 and a robot hand coupled with the changer adapter 50 to the changer unit 10, the changer unit 10 is brought near to the changer adapter 50 arranged beforehand at a fixed storing position through a robot action of the industrial robot per se. When the changer unit 10 is brought to the changer adapter 50, the piston 20 of the changer unit 10 is located at the retracted position by the agency of the resilient pressure of the springs 22. When the changer unit 10 is pressed against the changer adapter 50 with the positioning pin 24 aligned with the positioning hole 74 of the changer adapter, the changer unit 10 and the changer adapter 50 are joined together and the conical surface 34 of the changer unit 10 engages closely with the conical surface 54 of the changer adapter 50. In this state, the clamping balls 14 stay near the conical surface 52 of the changer adapter 50 and yet are retained loosely within the retainer 16. Then, upon the supply of a pressurized fluid into the pressure chamber 26a of the cylindrical bore 26 of the changer unit 10 through the fluid pressure inlet-and-outlet port 28, the piston 20 is advanced by the fluid pressure against the resilient force of the springs 22. Consequently, the clamping balls 14 are pushed out to protrude from the retainer 16 and to be pressed against the conical surface 52 of the changer adapter 50. Accordingly, the conical surface 34 of the changer unit 10 and the conical surface 54 of the changer adapter 50 are engaged close together by the agency of the outward pressure of the clamping balls 14, so that the changer unit 10 and the changer adapter 50 are joined in a single unit. Thus, the robot hand coupled with the changer adapter 50 is mounted on the free end of the robot arm.

In taking the changer adapter 50 out of the changer unit 10 in order to replace the robot hand thus attached to the robot arm with another one, the annular groove formed in the changer adapter 50 between the E-ring received in the groove 60 and the shoulder of the upper circular surface 64 is moved through a robot action to a position where the groove engages with a suitable holder, described later. The holder is provided on a robot hand support table.

After the groove of the changer adapter 50 has been engaged with the holder, the pressurized fluid is discharged from the pressure chamber 26a of the cylindrical bore 26 of the changer unit 10 to permit the piston 20 to be retracted by the resilient force of the springs 22. Consequently, the clamping balls 14 become idle in the retainer 16 and hence the close engagement between the conical surface 34 of the changer unit 10 and the conical surface 54 of the changer adapter 50 is released. Accordingly, the changer unit 10 and the changer adapter 50 are separated by withdrawing the changer unit 10 from the changer adapter 50 through a robot action, that is, the robot hand coupled with the changer adapter 50 is removed from the free end of the robot arm. Then, in the same procedure as described hereinbefore, another changer adapter 50 coupled with a desired robot hand is fitted to the changer unit 10 to complete the automatic robot hand changing operation. As mentioned above, a pressurized fluid can be supplied to the robot hand through the space between the two annular grooves 38 and 40, the annular groove 58 of the changer adapter 50, and the pressurized fluid passageway 66 and 68 to operate the robot hand.

Figure 3:
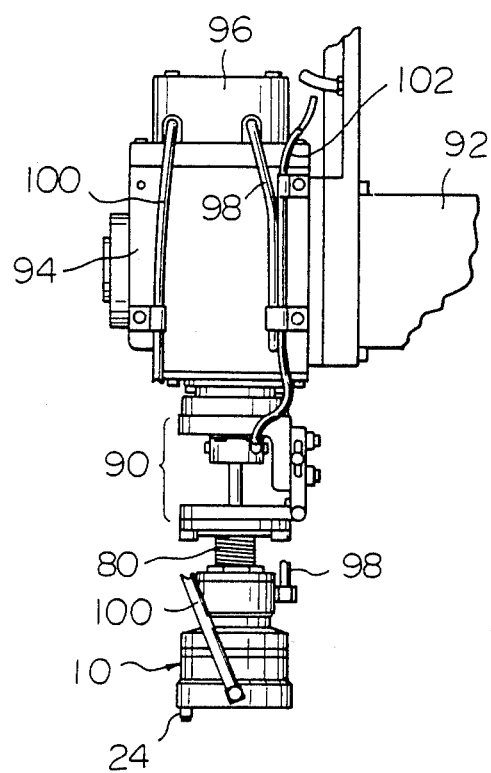
FIG. 3 is a front view of the changer unit of the same automatic hand changing device as attached to the free end of a robot arm.

FIG. 3 illustrates the changer unit 10 of the automatic hand changing device of the present invention as mounted on the free end of the robot arm of an industrial robot, in which the changer unit 10 is joined, through a shock absorbing spring mechanism 80 and a safety coupling mechanism 90, to a robot wrist unit 94 joined to the free end of a robot arm 92. Reference numeral 96 designates solenoid control valve for controlling the flow of the pressurized fluid. A pipe 98 for supplying the pressurized fluid for actuating the piston 20 and a pipe 100 for supplying the pressurized fluid for actuating the robot hand are connected to the solenoid control valve 96. A signal cable 102 is extended from the safety coupling 90 to the main unit of the industrial robot.

FIG. 4 includes a top plan view and a side elevation of a holder placed on a robot hand support table showing the exemplary construction thereof. A U-shaped recess 106 is formed in the holder 104. The U-shaped recess 106 receives the groove formed between the E-ring of the changer adapter 50 and the shoulder of the upper circular surface 64 to support the changer adapter 50 and the robot hand coupled with the same changer adapter 50.

From the foregoing description of the embodiment, it will be understood that the present invention provides an automatic hand changing device capable of automatically and alternately attaching robot hands of different functions to the free end of the robot arm of an industrial robot and of automatically changing the robot hands. Accordingly, the preparation of various robot hands beforehand make possible the attainment of diverse works by means of a single industrial robot and, hence, the flexibility of the capability of an industrial robot is extended. Consequently, the efficiency of works such as an assembly is further improved and, at the same time, enhanced labor-saving is attained.

We claim:

1. An automatic hand changing device for an industrial robot, comprising:

a changer unit having a cylindrical body having a cylindrical bore extending axially therein, one end portion of said body being defined by an end surface closing said bore and adapted to be fixedly attached to an end of an arm of an industrial robot, a piston slidably and sealably fitted in said bore, a rear end of said piston defining with said end portion a chamber in said bore and a front end of said piston being formed as a clamp operating means, a ball retainer fixedly attached to the opposite end of said body, a plurality of clamping balls radially movably retained by said ball retainer, spring means in abutting relation between said ball retainer and said piston, said spring means urging said piston in retraction toward said end surface of said body, a first port provided in said body in commuication with said chamber such that fluid under pressure may be admitted through said first port into said chamber for urging said piston in extension against said spring means toward said ball retainer to cause said clamp operating means to displace said plurality of balls radially outwardly, and an annular head fixedly attached with said ball retainer to said opposite end of said body, an interior of said head being provided with first and second radially outwardly tapered conical inner surfaces, said first conical inner surface being formed inwardly of said second conical inner surface and having a greater taper than said second conical inner surface; and a changer adapter adapted for engagement in said changer unit and having a hollow annular body having a cylindrical bore, a front end of said body being defined by an end surface adapted for mounting a hand of an industrial robot, a rear end of said body being formed with a tapered end portion having first and second radially outwardly tapered conical outer surfaces, said first conical outer surface being formed rearwardly of said second conical outer surface and having a greater taper than said second conical outer surface, said first and second conical outer surfaces respectively closely corresponding in axial length, diameter and taper with said first and second conical inner surfaces of said head of said changer unit so as to be capable of closely fitting therewith, a rear end of said bore of said adapter having an inner diameter sufficient to fit over a forward portion of said ball retainer of said changer unit when said clamping balls are held radially inwardly therein, and said rear end of said bore of said adapter being formed with a radially outwardly and forwardly tapered engagement surface;

whereby said changer unit may be placed over said changer adapter to engage said changer adapter therein with said first and second conical outer surfaces of said changer adapter in respective fitted relation with said first and second conical inner surfaces of said head of said changer unit, and fluid under pressure may be supplied through said first port of said body of said changer unit to said chamber to extend said piston such that said clamp operating means thereof displaces said plurality of balls radially outwardly into clamping engagement with said engagement surface of said changer adapter to retain said changer adapter in clamped engagement in said changer unit.

2. The automatic hand changing device of claim 1, wherein said head of said changer unit is further provided at its front end surface with an axially projecting positioning pin, and said changer adapter is further provided at its front end with an annular flange having an axial positioning hole for receiving said positioning pin, whereby said changer unit and said changer adapter may be coupled in fixed circumferential positional relation.

3. The automatic changing device of claim 1, wherein said head of said changer unit and said tapered end portion of said changer adapter define therebetween a fluid passageway for permitting a pressurized fluid to pass therethrough when said changer adapter is engaged with said changer unit, said pressurized fluid operating to control a robot hand mounted to said changer adapter.

4. The automatic hand changing device of claim 1, wherein said interior of said head of said changer unit is further provided with first and second axially spaced annular grooves, first and second O-rings respectively fitted in said first and second annular grooves, and a second port in said head in communication with a spaced defined in said interior between said first and second annular grooves, and wherein said changer adapter is further provided with a third annular groove formed in said second conical outer surface thereof, fluid passage means in said body thereof in communication with said third annular groove and a third port in an outer surface of said body thereof, said third annular groove being so located on said body of said changer adapter as to face said space in said interior of said head defined by said first and second annular grooves thereof when said changer adapter is engaged in said changer unit, such that a sealed fluid passageway is formed between said interior of said head, said first and second O-rings and said third axial groove of said body of said changer adapter, said fluid passageway being in communication with said second port of said changer unit and said third port of said changer adapter for permitting fluid under pressure to be supplied therethrough for controlling a robot hand mounted to said changer adapter.

* * * * *